Patented Mar. 14, 1950

2,500,713

UNITED STATES PATENT OFFICE 2,500,713

MONOALKAMINE ESTERS OF PYRROLE-3-CARBOXYLIC ACIDS

Jackson P. Sickels and Theodore F. Scholz, Plainfield, N. J., assignors to American Cyanamid Company, New York, N. Y., a corporation of Maine No Drawing. Application November 13, 1946, Serial No. 709,405

9 Claims. (Cl. 260—313)

This invention relates to alkamine esters of pyrrole-3-carboxylic acids.

Certain esters of the pyrrole-3-carboxylic acid have been prepared by ordinary methods, but the alkamine esters are not known and cannot be readily prepared by ordinary means. It is with these esters that the present invention is concerned and they may be represented by the following structural formula:

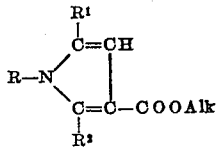

in which R is hydrogen or alkyl and $R^1$ and $R^2$ are the same or different alkyls, and Alk is a radical of a dialkylamino alcohol. The esters of the present invention are useful for a number of purposes, some being activators for rubber accelerators and some exhibiting local anaesthetic power.

While the present invention is not limited to a particular method of preparation we prefer to produce the esters by catalyzed alcoholysis of the corresponding alkyl esters, using an alkali metal alcoholate as a catalyst. Some of the alkyl esters are known and others can be readily prepared from the corresponding 3,4-diesters by hydrolysis and anhydridization, formation of an acid ester and decarboxylation.

The most readily formed esters are those containing methyl groups in the 2,5 position and these compounds are preferred. Compounds containing other alkyls in the 2,5 position are prepared by producing 3,4 diesters by the Knorr synthesis using ketosuccinic esters other than those of diacetosuccinic acid. For example, a 2,5 diethyl product is obtained when a diester of dipropionosuccinic acid is employed.

The alkamine esters of the present invention are obtainable in the form of the free bases or in the form of their salts, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless otherwise specified.

EXAMPLE 1

*The hydrochloride of β-diethylaminoethyl-2,5-dimethylpyrrole-3-carboxylate*

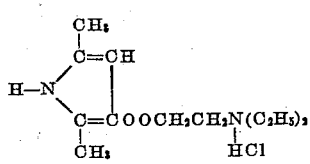

40 parts of ethyl 2,5-dimethylpyrrole-3-carboxylate (which may be prepared by condensation of chloroacetone with ethyl acetoacetate in the presence of ammonia) and 81 parts of β-diethylaminoethanol are mixed and a small piece of sodium added as a catalyst. The reaction mixture is heated up to 150–160° C. until from 10–30 parts of ethyl alcohol distill over. The bath temperature is then lowered below 140° C. and the excess amino alcohol distilled off under reduced pressure. The residue is thoroughly extracted with ether, the extracts washed with brine, then dehydrated. Dry hydrogen chloride is then added gradually with constant stirring until an oil separates which eventually solidifies on cooling. The acid addition should be continued until a very small excess is present and the solid turns pink and shows incipient resinification. It is then filtered, washed with dry ether, dissolved in chloroform and decolorized with activated carbon. The addition of dry ether then precipitates an oil which crystallizes on slow cooling. Two forms are obtained, one a white crystalline and one a dark green amorphous solid. The amorphous solid may be transformed into the crystalline form by fractional crystallization from the same solvent. The product melts at 143.9–145.3° C. and is soluble in water, ethyl alcohol and chloroform, but insoluble in dry ether.

When the reaction is carried out using the methyl 2,5-dimethylpyrrole-3-carboxylate instead of the ethyl ester, the same product is obtained and the reaction proceeds in the same manner, methyl alcohol distilling over instead of ethyl alcohol.

EXAMPLE 2

β - *Diethylaminoethyl - 1,2,5 - trimethylpyrrole-3-carboxylate-hydrochloride*

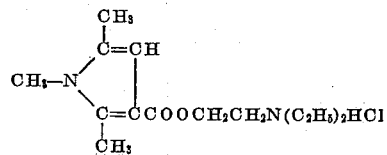

115 parts of ethyl 1,2,5-trimethylpyrrole-3-carboxylate are added to 500 parts of diethylaminoethanol in which 1/40 of the stoichiometrical equivalent of sodium has been dissolved. The reaction mixture is heated up until slow distillation begins at about 78° C. The distillation is continued with gradually rising temperatures up to about 159° C. at which the major portion of the material volatile at this temperature comes off. The pressure is then reduced to about 15 mm. and the last of the unreacted β-diethylaminoethanol distilled off.

A residue is obtained which is dissolved in ether and washed with water. The ether solution is dried and dry hydrogen chloride added to precipitate the hydrochloride in an oily form which solidifies on standing. It is recovered by filtration, dried and recrystallized from butyl alcohol, resulting in a brown powder melting at 182–184° C.

EXAMPLE 3

*The hydrochloride of β-diethylaminoethyl, 1-ethyl-2,5-dimethylpyrrole-3-carboxylate*

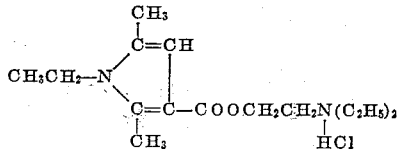

1-ethyl-2,5-dimethylpyrrole-3-carboxylate - 4-carboxylic acid is prepared from diethyl-1-ethyl-2,5-dimethylpyrrole-3,4-dicarboxylate by hydrolysis with potassium hydroxide followed by formation of the anhydride of the acid produced by reaction with acetic anhydride and esterification to form the acid ester by heating with anhydrous ethyl alcohol.

82 parts of the ethyl-1-ethyl-2,5-dimethylpyrrole-3-carboxylate-4-carboxylic acid are distilled at 4–5 mm. Carbon dioxide evolves and the final temperature of the heating bath rises to about 250° C. A colorless liquid is obtained boiling at 130–133° C. at 6–7 mm. and constituting the monoester.

51 parts of the monoester are mixed with 170 parts β-diethylaminoethanol and 1 part metallic sodium added. The reaction mixture is heated until from 10–20 parts of ethyl alcohol distill over and the temperature begins to rise above 78° C. The pressure is then lowered to 30 mm. and the excess amino alcohol distilled off, the temperature being permitted to rise to about 125° C. in the last stages. A residue is obtained which is extracted with ether, the extract washed with dilute sodium chloride solution and then with water. Thereupon it is dried and a solution of dry hydrogen chloride in anhydrous ether added until neutral to litmus. The hydrochloride obtained is filtered, dried, preferably under reduced pressure, and melts at 144.9–145.9° C. (corr.). It is soluble in water, ethyl alcohol, acetone, chloroform, carbon tetrachloride and benzene, but insoluble in anhydrous ether or petroleum ether.

EXAMPLE 4

*The hydrochloride of β-diethylaminopropyl-1-ethyl-2,5-dimethylpyrrole-3-carboxylate*

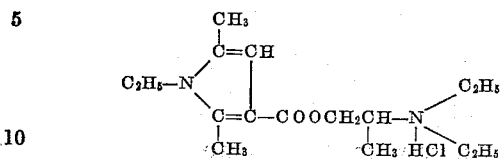

The procedure of Example 3 is followed but instead of using β-diethylaminoethanol a corresponding amount of β-diethylaminopropanol is used. The product obtained is similar in its characteristics to the diethylaminoethyl ester.

EXAMPLE 5

*The hydrochloride of β-diethylaminoethyl, 1-n-butyl-2,5-dimethylpyrrole-3-carboxylate*

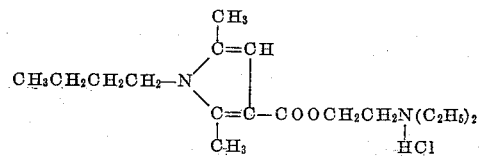

Ethyl - 1 - n-butyl-2,5-dimethylpyrrole-3-carboxylate-4-carboxylic acid is prepared by the method described in Example 3, substituting the n-butyl for the ethyl compound. 62 parts are then heated at 3 mm. pressure until evolution of carbon dioxide ceases. This involved raising the temperature up to about 250° C. An oil is obtained to which 97 parts of β-diethylaminoethanol are added having a small amount of metallic sodium dissolved therein. The mixture is then heated at about 100° C. for about an hour and the temperature then raised to about 150° C. until at least 10 parts of ethyl alcohol have distilled over. The pressure is then lowered to 12 mm. and unreacted β-diethylaminoethanol distilled off.

A residue is obtained which is extracted with ether, the ether extracts washed with brine and dried. A solution of dry hydrogen chloride in anhydrous ether is then gradually added with stirring to produce the hydrochloride which is filtered, dried under vacuum and melts at about 106.8–108.6° C. (corr.). The product has the same solubility characteristics as the corresponding 1-ethyl derivative.

EXAMPLE 6

*β-diethylaminoethyl, 1-n-hexyl-2,5-dimethyl-pyrrole-3-carboxylate*

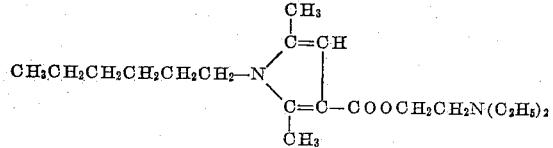

39 parts of ethyl 1-n-hexyl-2,5-dimethylpyrrole-3-carboxylate, prepared by the method of Example 3, substituting the n-hexyl compound for the ethyl compound, are dissolved in 91 parts of β-diethylaminoethanol to which a small piece of metallic sodium has been added. The solution is then heated at 105° C. for several hours, the temperature then gradually raised to 158° C., at which temperature a considerable portion of the ethyl alcohol distills off. The pressure is then lowered to 12 mm. and the unreacted amino alcohol removed.

A residue is obtained which is extracted with ether, washed and dried. The ether is then evaporated, leaving the free base in the form of a light yellow oil boiling at 202–207° C. (corr.) at about 2 mm. pressure. It is soluble in dilute hydrochloric acid and ethyl alcohol, but insoluble in water.

EXAMPLE 7

*The hydrochloride of β-dimethylaminoethyl-2,5-dimethylpyrrole-3-carboxylate*

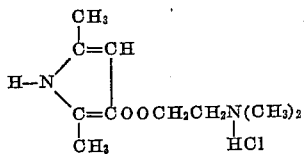

The procedure of Example 1 is followed using a stoichiometrically equivalent amount of β-dimethylaminoethanol in place of the 81 parts of β-diethylaminoethanol. A high boiling point is obtained which has the same properties as the product of Example 1.

EXAMPLE 8

*The hydrochloride of γ-dipropylaminopropyl, 1-ethyl-2,5-dimethylpyrrole-3-carboxylate*

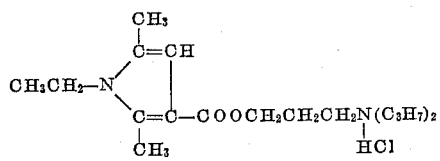

The procedure of Example 3 is followed replacing the β-diethylaminoethanol with a stoichiometrically equivalent amount of γ-dipropylaminopropanol. A high boiling point is obtained which has the same properties as the product of Example 3.

In the foregoing examples the catalyst sodium is added to the β-diethylaminoethanol, where it of course reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say, amounts which are sufficient to vigorously catalyze the reaction but far below stoichiometric proportions. Good results are obtained with amounts of alcoholate of the order of $\frac{1}{10}$ mole per mole of the carbethoxypyrrole. This proportion is not critical and the term "catalytic amounts" will be used in the claims in its ordinary sense of small amounts far below stoichiometric proportions. Sodium can be replaced by potassium, but this presents no advantage in the reaction and therefore, does not economically warrant the higher cost of potassium. For this economic reason the sodium alcoholate is preferred as the catalyst.

In many of the examples the hydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of our copending application Serial No. 496,958, filed July 31, 1943, now abandoned.

We claim:

1. A compound selected from the group consisting of an ester of a 1,2,5-trialkylpyrrole-3-carboxylic acid, having the following formula:

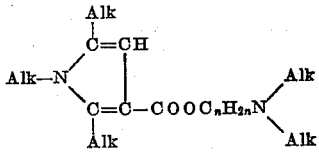

in which Alk is alkyl and $n$ is an integer greater than zero, and addition salts of the ester with strong acids.

2. Compounds according to claim 1 in which the alkyl groups on the 2 and 5 carbon atoms of the pyrrole ring are methyl.

3. Compounds according to claim 2 in which the alkyl group attached to the 1 nitrogen atom of the pyrrole ring is ethyl.

4. A compound selected from the group consisting of diethylaminoethyl esters of 1,2,5-trimethylpyrrole-3-carboxylic acid having the formula:

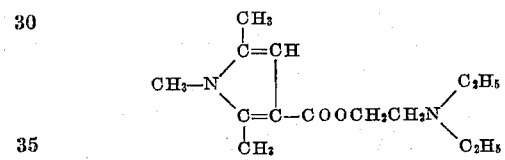

and addition salts of the esters with strong acids.

5. A compound selected from the group consisting of diethylaminoethyl esters of a 1-butyl-2,5-dimethylpyrrole-3-carboxylic acid having the formula:

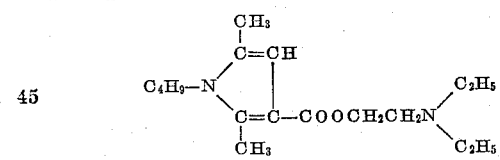

and addition salts of the esters with strong acids.

6. A compound selected from the group consisting of diethylaminoethyl esters of a 1-ethyl-2,5-dimethylpyrrole-3-carboxylic acid having the formula:

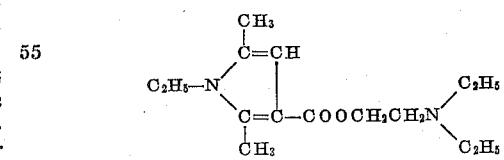

and addition salts of the esters with strong acids.

7. A method of preparing an alkamine ester of a 2,5-dialkylpyrrole-3-carboxylic acid having the formula:

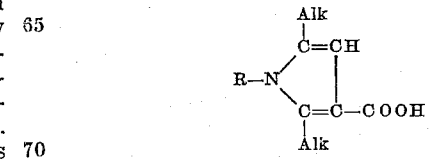

in which Alk is alkyl and R is $C_mH_{2m+1}$ and where $m$ is an integer, which comprises heating a dialkylaminoalkanol and an alkyl ester of the pyrrole carboxylic acid in the presence of catalytic amounts of an alkali metal alcoholate.

8. A method according to claim 7 in which R is alkyl.

9. A method according to claim 8 in which the alkyl groups on the 2 and 5 carbon atoms of the pyrrole ring are methyl.

JACKSON P. SICKELS.
THEODORE F. SCHOLZ.

REFERENCES CITED

The following references are of record in the file of this patent:

Gilman et al., J. Am. Chem. Soc., vol. 47, pages 245 to 254 (January 1925).